(12) United States Patent
McAdam

(10) Patent No.: US 8,278,918 B2
(45) Date of Patent: Oct. 2, 2012

(54) METHOD FOR OPERATING OF A METAL DETECTION SYSTEM AND METAL DETECTION SYSTEM

(75) Inventor: Stephen McAdam, Warrington (GB)

(73) Assignee: Mettler-Toledo Safeline Limited, Manchester (GB)

( * ) Notice: Subject to any disclaimer, the term of this patent is extended or adjusted under 35 U.S.C. 154(b) by 0 days.

(21) Appl. No.: 13/239,175

(22) Filed: Sep. 21, 2011

(65) Prior Publication Data
US 2012/0086455 A1 Apr. 12, 2012

(30) Foreign Application Priority Data

Oct. 7, 2010 (EP) .................................... 10186893

(51) Int. Cl.
*G01N 27/72* (2006.01)
*G01V 3/10* (2006.01)
*G01V 3/02* (2006.01)
(52) U.S. Cl. .................. 324/239; 324/228; 324/329
(58) Field of Classification Search .................. 324/228, 324/239, 329
See application file for complete search history.

(56) References Cited

U.S. PATENT DOCUMENTS

| | | | |
|---|---|---|---|
| 2,598,252 A | 5/1952 | Gossick | |
| 3,617,866 A | 11/1971 | Dowsett et al. | |
| 3,721,821 A | 3/1973 | Blanyer | |
| 3,758,849 A | 9/1973 | Susman et al. | |
| 3,896,608 A | 7/1975 | Garrott | |
| 4,176,555 A | 12/1979 | Dorman | |
| 4,263,551 A | 4/1981 | Gregory et al. | |
| 4,300,097 A | 11/1981 | Turner | |
| 4,451,812 A | 5/1984 | Vescovi et al. | |
| 4,563,644 A | 1/1986 | Lenander et al. | |
| 4,800,477 A | 1/1989 | Esposito | |
| 4,837,511 A | 6/1989 | Whittington et al. | |

(Continued)

FOREIGN PATENT DOCUMENTS

DE 3406736 A1 8/1985

(Continued)

OTHER PUBLICATIONS

Abbas, H.J. et al., The detection and location of foreign metal objects in conveyed products, Trans Inst M C., Apr.-Jun. 1986, pp. 76-84, 8(2).

(Continued)

*Primary Examiner* — Bot Ledynh
(74) *Attorney, Agent, or Firm* — Standley Law Group LLP

(57) ABSTRACT

A method for operating of a metal detection system may comprise a balanced coil system with a transmitter coil that is connected to a transmitter unit, which generates transmitter signals having a transmitter frequency that is selected from a group of at least two transmitter frequencies, and with a first and a second receiver coil that provide output signals to a signal input of at least one amplifier unit included in a receiver unit, wherein the output signals compensate each other so that the system is in balance. A system adapted to operate according to an exemplary method is also provided. In an exemplary embodiment, a control unit generates a control signal according to the transmitter frequency of the transmitter unit and that is provided to the control input of at least one controllable impedance unit, which is coupled to the signal input of the at least one amplifier unit, wherein the control signal is adapted to control the impedance value of the at least one controllable impedance unit in such a way that the impedance value is increased or lowered when the transmitter frequency is increased or lowered.

20 Claims, 5 Drawing Sheets

U.S. PATENT DOCUMENTS

| | | | |
|---|---|---|---|
| 4,843,324 | A | 6/1989 | Humphreys, Jr. et al. |
| 4,965,522 | A | 10/1990 | Hazen et al. |
| 5,003,271 | A | 3/1991 | Swanson |
| 5,034,689 | A | 7/1991 | Inoue et al. |
| 5,068,612 | A | 11/1991 | Auslander et al. |
| 5,264,733 | A | 11/1993 | Tigges |
| 5,304,927 | A | 4/1994 | Thomas et al. |
| 5,345,160 | A | 9/1994 | Corniere |
| 5,386,182 | A | 1/1995 | Nikami |
| 5,572,121 | A | 11/1996 | Beswick |
| 5,642,050 | A | 6/1997 | Shoemaker |
| 5,650,726 | A | 7/1997 | Gasnier et al. |
| 5,729,143 | A | 3/1998 | Tavernetti et al. |
| RE35,806 | E | 5/1998 | Rossi et al. |
| 5,859,533 | A | 1/1999 | Gasnier et al. |
| 5,929,634 | A | 7/1999 | Artinger |
| 5,969,528 | A | 10/1999 | Weaver |
| 5,994,897 | A | 11/1999 | King |
| 6,037,870 | A | 3/2000 | Alessandro |
| 6,094,079 | A | 7/2000 | Boggs et al. |
| 6,118,337 | A | 9/2000 | Schweighofer |
| 6,130,489 | A | 10/2000 | Heimlicher |
| 6,157,190 | A | 12/2000 | Nagaishi et al. |
| 6,177,792 | B1 | 1/2001 | Govari et al. |
| 6,236,200 | B1 | 5/2001 | Nekado et al. |
| 6,337,566 | B1 | 1/2002 | Fujisaki et al. |
| 6,420,866 | B1 | 7/2002 | Goldberg et al. |
| 6,437,573 | B1 | 8/2002 | Golder et al. |
| 6,724,191 | B1 | 4/2004 | Larsen |
| 6,958,603 | B2 | 10/2005 | Kondo |
| 7,102,347 | B2 | 9/2006 | Kondo |
| 7,663,361 | B2 | 2/2010 | Nishio et al. |
| 2002/0093338 | A1 | 7/2002 | Rowan |
| 2003/0117270 | A1 | 6/2003 | Dimmer et al. |
| 2003/0141866 | A1 | 7/2003 | Johnson et al. |
| 2003/0164766 | A1 | 9/2003 | Britton |
| 2004/0046550 | A1 | 3/2004 | Kondo |
| 2005/0104594 | A1 | 5/2005 | Nelson et al. |
| 2006/0006872 | A1 | 1/2006 | Nelson |
| 2006/0226833 | A1 | 10/2006 | Kubotera et al. |

FOREIGN PATENT DOCUMENTS

| | | | |
|---|---|---|---|
| DE | 3713363 | A1 | 11/1988 |
| DE | 4424058 | C1 | 10/1995 |
| DE | 202004011073 | U1 | 11/2004 |
| EP | 0124042 | A2 | 11/1984 |
| EP | 0215244 | A2 | 3/1987 |
| EP | 0281014 | A2 | 9/1988 |
| EP | 0368762 | A2 | 5/1990 |
| EP | 0369954 | A1 | 5/1990 |
| EP | 0379804 | A2 | 8/1990 |
| EP | 0780704 | A2 | 6/1997 |
| EP | 0782012 | A2 | 7/1997 |
| EP | 1202077 | A2 | 5/2002 |
| EP | 1502544 | A1 | 2/2005 |
| GB | 400041 | | 1/1933 |
| GB | 528568 | | 2/1939 |
| GB | 677773 | | 8/1952 |
| GB | 776163 | | 6/1957 |
| GB | 819893 | | 9/1959 |
| GB | 1436900 | | 5/1976 |
| GB | 2004069 | A | 3/1979 |
| GB | 2025630 | A | 1/1980 |
| GB | 2026169 | A | 1/1980 |
| GB | 1603578 | | 11/1981 |
| GB | 2204133 | A | 11/1988 |
| GB | 2372329 | A | 8/2002 |
| GB | 2423366 | A | 8/2006 |
| GB | 2462212 | | 2/2010 |
| JP | 53-142260 | A | 12/1978 |
| JP | 57-133373 | A | 8/1982 |
| JP | 57-187649 | A | 11/1982 |
| JP | 57-187650 | A | 11/1982 |
| JP | 59-40287 | A | 3/1984 |
| JP | 59-48673 | A | 3/1984 |
| JP | 59-60274 | A | 4/1984 |
| JP | 59-60277 | A | 4/1984 |
| JP | 60-178318 | A | 9/1985 |
| JP | 60-225084 | A | 11/1985 |
| JP | 1-176972 | A | 7/1989 |
| JP | 3-218490 | A | 9/1991 |
| JP | 9-80162 | A | 3/1997 |
| JP | 10-111363 | A | 4/1998 |
| JP | 11-337656 | A | 12/1999 |
| JP | 2000-56032 | A | 2/2000 |
| JP | 2001-91661 | A | 4/2001 |
| JP | 2001-91663 | A | 4/2001 |
| JP | 2002-168965 | A | 6/2002 |
| JP | 2002-333485 | A | 11/2002 |
| JP | 2004-205319 | A | 7/2004 |
| JP | 2004-251712 | A | 9/2004 |
| WO | 87/04801 | A1 | 8/1987 |
| WO | 88/03273 | A1 | 5/1988 |
| WO | 97/36143 | A1 | 10/1997 |
| WO | 02/25318 | A1 | 3/2002 |
| WO | 2006/087510 | A1 | 8/2006 |
| WO | 2008/006178 | A1 | 1/2008 |

OTHER PUBLICATIONS

Asakawa, K. et al., Metal Detector for Tracing Submarine Telecommunication Cables, IEEE Transactions on Instrumentation and Measurement, Dec. 1983, pp. 477-483, IM-32(4).

Dairy Foods, Buyers Mart: Plant Equipment, web pages from www.dairyfoods.com, 2010, 6 pages, BNP Media.

Brown, J., Brief H-Bridge Theory Of Operation, Tutorials, 2011, 4 pages, Dallas Personal Robotics Group.

CEIA, Industrial Metal Detector THS, Oct. 31, 2000, 96 pages, CEIA S.p.A., Italy.

CEIA, Industrial Metal Detector THS, Dec. 5, 2001, 97 pages, Ceia S.p.A., Italy.

CEIA, Industrial Metal Detector, Apr. 2002, 40 pages, Ceia S.p.A., Italy.

CINTEX LTD., Foodex Meatex 2004, Entrepreneur Food Trade Review, Feb. 2004, 2 pages, Food Trade Press Ltd. and Gale Group.

Dairy Field, Variable-frequency metal detector, web pages from www.allbusiness.com, Jan. 1, 2005, 2 pages, AllBusiness.com, Inc.

Flind, A., Magnum Metal Locator, Practical Electronics, 1980, pp. 1-11, Wimbourne Publishing.

Flind, A., Magnum Metal Locator Part 3, Practical Electronics, 1981, pp. 1-22, Wimbourne Publishing.

Gray, J., Development of an advanced industrial metal detector instrumentation, Computing & Control Engineering Journal, Jun. 1994, pp. 117-120, 5(3).

Hamo, D.J., A 50W, 500kHz, Full-Bridge, Phase-Shift, ZVS Isolated DC to DC Converter Using the HIP4081A, Intersil Intelligent Power, Apr. 1995, pp. 1-16, AN9506.

Loma Systems, Inc., Loma Launches Cintex Brand Sentry VF, First-Ever, Variable Frequency Metal Detector, web page from www.beverageonline.com, Nov. 16, 2004, 1 page, VertMarkets, Inc.

Nelson, C.V. et al., Wide Bandwidth Time-Domain Electromagnetic Sensor for Metal Target Classification, IEEE Transactions on Geoscience and Remote Sensing, Jun. 2001, pp. 1129-1138, 39(6).

Heat and Control, CEIA THS/3F Metal Detector Product Information Sheet, web page from www.heatandcontrol.com, 2006, 1 page, Heat and Control, Inc.

Heat and Control, THS/3F Multi-frequency metal detector for quality control, 2 pages.

WATTAGNET.COM, Mettler-Toledo Safeline Profile metal detection systems, web pages from www.wattagnet.com, printed Feb. 23, 2011, 2 pages.

PACKWORLD.COM, Cintex Sentry VF variable frequency metal detector, web page from www.packworld.com, Nov. 2004, 1 page.

Brand protection looks to Tailored solutions from inspection systems, Machinery Update, Mar./Apr. 2004, pp. 85-90.

Kittel, C.F. et al., Metal Detector, U.S. Appl. No. 11/883,950, international filed Jan. 9, 2006, 49 pages.

METHOD FOR OPERATING OF A METAL DETECTION SYSTEM AND METAL DETECTION SYSTEM

This application claims priority under 35 U.S.C. §119 to European Patent Application No. 10186893.3, filed on Oct. 7, 2010, which is hereby incorporated by reference in its entirety.

BACKGROUND AND SUMMARY OF THE INVENTION

Exemplary embodiments of the present invention relate generally to a method for operating a metal detection system and to a metal detection system operating according to this method.

In the industry where machinery is involved in the production of goods, there is always a possibility that a piece of metal, such as a screw or a bolt, does break away from the machinery, and finally ends up in the processed product. Therefore metal detection systems are used at various stages of a production process to detect products that are contaminated by metal. Metal detection systems are also often used for inspecting finished product, in order to ensure consumers' safety and quality standards.

Most modern metal detection systems utilize a search head comprising a "balanced coil system" that comprises three coils, one transmitter coil and two receiver coils that are aligned in parallel. During the inspection process, the product, typically transported on a conveyor belt, is passed through the coils of the "balanced coil system". In the transmitter coil, which is placed between the receiver coils, flows an electrical current that generates an alternating magnetic field that induces an electrical signal in the two receiver coils. The receiver coils are positioned symmetrically to the transmitter coil, so that identical signals are induced in both receiver coils when no product is present in the "balanced coil system." In addition, the receiver coils are coupled together in such a manner that the signals induced therein are subtracted from each other. In that way, when no product is present in the balanced coil system, there is a zero signal at the output of the receiver coils. However, a piece of magnetically and/or electrically conductive material, that passes through the balanced coil system, will disturb the magnetic field and will cause modifications of the electrical signal(s) induced in the receiver coils. These perturbations occur first in the first receiver coil and then in the second receiver coil, when the product approaches it. As a result, an electrical signal with a specific phase and amplitude will appear at the output of the receiver coils, when the product passes through the "balanced coil system". Each magnetic and/or conductive material passing through the metal detection system creates a different signal, according to its conductivity, its magnetic permeability, its shape, its size and its orientation relative to the receiver coils.

To detect the presence of metal in the product, the signals induced in the receiver coils are processed in the receiver stage that typically comprises an input amplifier. In a further stage, the processed signals are analyzed in phase and amplitude in order to detect metal contamination. Finally, the results are displayed on a user interface and/or signaled to the control system.

Various types of metals that are used in machinery, including ferrous (iron), non-ferrous (e.g. copper, aluminum, brass) and various types of stainless steel, may appear as a contaminant in a processed product. If such a metal has a high magnetic permeability, like ferrite, it will primarily be reactive, that means that its signal phase will be close to zero, while a metal with a low magnetic permeability will primarily be resistive and have a signal phase close to 90 degrees relative to the phase of the transmitter signal. Ferrous metals are easily detectable because of their small phase difference with the transmitter signal. Contaminant materials with a high conductivity can easily be detected if the inspected product is dry. On the other hand, non-ferrous metals and particularly stainless steel are difficult to detect in wet products since their phase is similar to the product phase.

However, not every metal passing through a metal detection system is a contaminant, since it could be part of the product packaging. During inspection, the product is often in its final state and already packed. It can be wrapped in a metalized film, typically a plastic film coated with aluminum. This electrically conductive metal of the product packaging creates a signal in the metal detection system that must not be confused with a signal caused by a metal contaminant. Hence in order to detect a contaminated product, it is required that the metal detection system is capable of distinguishing between signals originating from packaging material and signals originating from metal contaminants.

Further, not all disturbances of the magnetic field of the receiver coils are caused by products and metal contaminants traveling through the "balanced coil system." Vibrations of a conductive material near the balanced coil system may also cause signal changes in the receiver coils that need to be distinguished from signals caused by contaminated products. Signals caused by vibrations are primarily in phase with the transmitter signal.

Food products like cheese, fresh meat, warm bread, jam, and pickles are generally electrically conductive if they contain water, salt, or acid. Therefore, such products traveling through the balanced coil system also disturb the magnetic fields, thus causing a signal at the output of the receiver coils. In order to avoid a false rejection of a product, the product signal needs to be compensated or eliminated.

Hence, for a reliable product inspection, signals caused by vibrations, the product and the packaging have to be eliminated so that only signals are considered that are caused by metal contaminants. However, it has been found that the phase and the magnitude of the signals caused by the product and the metal contaminants depend on the applied transmitter frequency.

In known systems, the transmitter frequency is therefore selectable in such a way that the phase of the signal components of the metal contaminants will be out of phase with the product signal component.

U.S. Pat. No. 5,994,897A, for example, discloses an apparatus that is capable of switching between at least two different transmitter frequencies such that any metal particle in a product will be subject to scanning at different frequencies. The frequency of operation is rapidly changed so that any metal particle passing through on a conveyor belt will be scanned at two or more different frequencies. In the event that for a first transmitter frequency the signal component caused by a metal particle is close to the phase of the signal component of the product and thus is masked, then it is assumed that for a second frequency, the phase of the signal component caused by the metal particle will differ from the phase of the signal component of the product so that the signal components can be distinguished. By switching between many frequencies, it is expected that one frequency will provide a suitable sensitivity for any particular metal type, size, and orientation.

However, metal detection systems that operate at different frequencies typically have a lower sensitivity than systems that are tuned to a single frequency.

Hence, although signals of metal contaminants may be obtained with a desirable phase, the detection of these signals may still fail due to the low sensitivity of the metal detection system.

Also known in the art are metal detectors such as described in U.S. Pat. No. 6,724,191 B1, to Larsen, which discloses various circuits including an H-bridge switch network and a pulse width modulated switched capacitor resonator, for simultaneously resonating at several frequencies.

U.K. Patents GB 2423366 B and GB 2462212 B both refer to metal detectors that contain a drive circuit comprising four switches arranged as a full bridge circuit, wherein the coil system is connected across the output of the bridge. A programmable logic device controls the switches via a plurality of drive maps stored in the programmable logic device, with each drive map containing a switching sequence for a respective predetermined frequency of operation.

U.S. Pat. No. 5,859,533 to Gasnier describes an electromagnetic tomographic emitter for operating at variable frequencies to detect subsurface characteristics.

U.S. Pat. No. 5,304,927 discloses a method and apparatus for detection of metal in food products as packages of said food products are passed through the detector on a conveyor.

An exemplary embodiment of the present invention is therefore based on providing an improved method for operating a metal detection system that uses two or more transmitter frequencies as well as on providing a metal detection system adapted to operate according to this method.

Particularly, an exemplary embodiment provides a method that allows for detection of metal contaminants, particularly stainless steel contaminants, with high sensitivity, while signals caused by the product, the packaging, vibrations, or other potential disturbances are suppressed or eliminated.

More particularly, an exemplary embodiment provides an improved method for a metal detection system that allows the selection of numerous transmitter frequencies, preferably with small steps in the range from a few kHz to 1 MHz, or that generates square wave signals that comprise a large number of harmonics, for which signals with a desirable phase can be obtained for the metal contaminants.

An exemplary embodiment of the metal detection system comprises a balanced coil system with a transmitter coil and a first and a second receiver coil. The transmitter coil is connected to a transmitter unit, which generates transmitter signals having a transmitter frequency that is selected from a group of at least two transmitter frequencies. The first and the second receiver coil, that are coupled to each other, provide output signals to the signal input of at least one amplifier unit provided in a receiver unit. Due to the symmetrical arrangement of the receiver coils with respect to the transmitter coil and due to the inverse winding of the receiver coils, the signals induced in the receiver coils compensate one another in the absence of an external influence, such as a product, with or without contamination, or other disturbances such as vibrations. In this balanced state, the combined output signal of the receiver coils is zero.

According to an exemplary embodiment, a control unit provides a control signal, which depends on the transmitter frequency of the transmitter unit, to the control input of at least one controllable impedance unit. This controllable impedance unit is coupled to the signal input of the at least one amplifier unit, wherein the control signal is adapted to control the impedance value of the controllable impedance unit in such a way that the impedance value is increased or lowered according to the selected transmitter frequency.

By suitably varying the input impedance applied to the input of the amplifier in accordance with the selected transmitter frequency, the sensitivity of the metal detection system to contaminant metals is significantly improved. At the same time, a phase angle of signals originating from metalized film of packaging materials is kept close to 90° at any time.

In an exemplary embodiment, the receiver coils are coupled directly to the input of the amplifier unit via the controllable impedance unit. In another embodiment, the receiver coils are coupled to the primary windings of an input transformer, whose secondary windings are coupled via the controllable impedance unit to the input of the amplifier unit. The input transformer is used to isolate the amplifier unit galvanically from the receiver coils. Further, with a fixed or variable transmission ratio, a desirable voltage level of the input signal can be set.

In an exemplary embodiment, the receiver coils are connected with one tail to each other and with the other tail to the respective tails of two identical center-tapped primary windings of a balanced transformer. The balanced input transformer has two identical center-tapped secondary windings, whose opposite tails are connected to the input of the amplifier via the controllable impedance unit.

In a further embodiment, the controllable impedance unit comprises a transistor or a relay. The transistor can be employed as a switch to connect and disconnect a resistance to or from the input impedance amplifier circuit. In alternative embodiments a relay can be connected in parallel or in series with a resistor to vary the resistance value of the controllable impedance unit.

In an exemplary embodiment, preferably a low input impedance value is selected for low transmitter frequencies and a higher impedance value is selected for higher transmitter frequencies. With transmitter frequencies in the range 1 kHz to 300 kHz, input impedance in the range between 10 Ohm and 100 Ohm, most preferably close to 20 Ohm such as 22 Ohm, allows setting the phase of the signal originating from metalized film of the packaging material to about 90°. For transmitter frequencies above 300 kHz, low input impedance may unfavorably affect the sensitivity of metal contaminant signals. Therefore by increasing the input impedance value, the cut-off frequency of the low-pass filter formed by the head coil and the controllable impedance unit is also increased, and the gain at the required frequency is preserved. This can be realized with the selection of the input impedance above 100 Ohm, most preferably close to 300 Ohm, such as 330 Ohm.

In a second basic embodiment, the output signal of the receiver coils may be amplified and then filtered by means of a variable filter unit comprising at least one filter, whose centre frequency and filter bandwidth are adapted to the selected transmitter frequency, which may represent a carrier signal that has been modulated by the signals of the product and the metal contaminants.

Applying filters to the selected transmitter frequencies, i.e. carrier frequencies, leads to a further significant improvement of the sensitivity of the metal detection system.

Especially at frequencies below 300 kHz, where known metal detection system typically had a poor sensitivity and an unfavorable phase response of the signals derived from metal film packaging, a solution of an exemplary embodiment provides significant advantages. The appropriate band-pass filters favorably allow restoring the phase of the signals derived from metalized film of packaging material to 90 degrees. Especially with a transmitter signal frequency of 100 kHz, a filter with a cut-off frequency of 200 kHz, and for transmitter signal frequency of 200 kHz and 300 kHz, a filter with a cut-off frequency of 400 kHz, may achieve most favorable results. In an exemplary embodiment, that means that it brings the phase of the signals derived from metalized film of packaging material very close to 90 degrees.

With a band-pass filter, favorably a low-pass filter, the content of harmonic frequencies of the receiver signal may be removed, the signals within the bandwidth may be amplified, and the phase of signals derived from packaging metal film may be corrected close to 90 degrees. Consequently, this signal may be suppressed easily in an exemplary embodiment. An example of the applied band-pass filters may improve the phase performance of signals derived from packaging metal film at all frequencies, but an exemplary embodiment of a combination of the band-pass filter and a low impedance value of the controllable impedance unit may provide even better results at frequencies below 300 kHz.

In an exemplary embodiment, dedicated circuits may be used to amplify each signal with a different gain that depends on that signal phase relative to the phase of the transmitter signal phase. With this measure, an improvement of the sensitivity of the metal detection system (particularly to stainless steel materials) and a reduction of the sensitivity to disturbing vibrations may be achieved.

With the above methods that may advantageously be used independently or in combination, signals that originate from metalized film of packaging materials may be reduced while signals originating from metal contaminants may be detected with higher sensitivity.

In an exemplary embodiment, the measures allow the selected transmitter frequency of the received signal to pass to the phase sensitive detectors, while signals resulting from harmonic distortion are suppressed.

For a more accurate phase correction, the input amplifier unit may comprise more than two selectable impedance values. The filter may be made with a Butterworth, Chebyshev, Bessel, Cauer filter, or other low-pass filters and may be of a first or higher order. Each filter may have a different cut-off frequency, and in an exemplary embodiment it is preferably applied by means of a switch, e.g., a multiplexer, that is controlled in accordance with the selected transmitter frequency, so that the applied filter may remove the harmonic content from the receiver signal. With a transmitter frequency above 300 kHz, the signal of metalized film packaging may be obtained with a phase close to 90 degrees, which means that it may easily be suppressed.

To correct the phase of the signals derived from metalized film packaging in an exemplary embodiment, a low-pass filter is applied in the signal path between the amplifier unit that receives the input signal from the receiver coils and the phase sensitive detector. In this example, the applied filter improves the phase of the signals derived from metalized film packaging at all transmitter frequencies and reduces harmonic frequencies at transmitter frequencies below 300 kHz.

Advantageously, the low-pass filters in an exemplary embodiment are fifth order Butterworth filters that have a maximally flat amplitude response. Selecting a fifth order filter may allow obtaining a clearer pass-over between passband and stop-band.

According to another embodiment of the invention, the input amplifier comprises a bipolar cascode amplifier circuit coupled with a differential amplifier. An example of a cascode amplifier is stable, and has furthermore a high and linear gain, independently of the present frequency. Preferably, the amplifier is a differential amplifier comprising two amplifier units that amplify the signals present at the two opposite tails of the secondary windings of the input transformer.

The control unit preferably comprises a processing unit with a computer program that is designed to select the settings of the controllable impedance unit and/or settings of the variable filter according to an exemplary embodiment. The settings may be selected from a table provided in the control unit, containing at least a set of transmitter frequencies and corresponding settings for the at least one variable impedance unit and/or corresponding settings for the variable filter unit.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Figure 1:
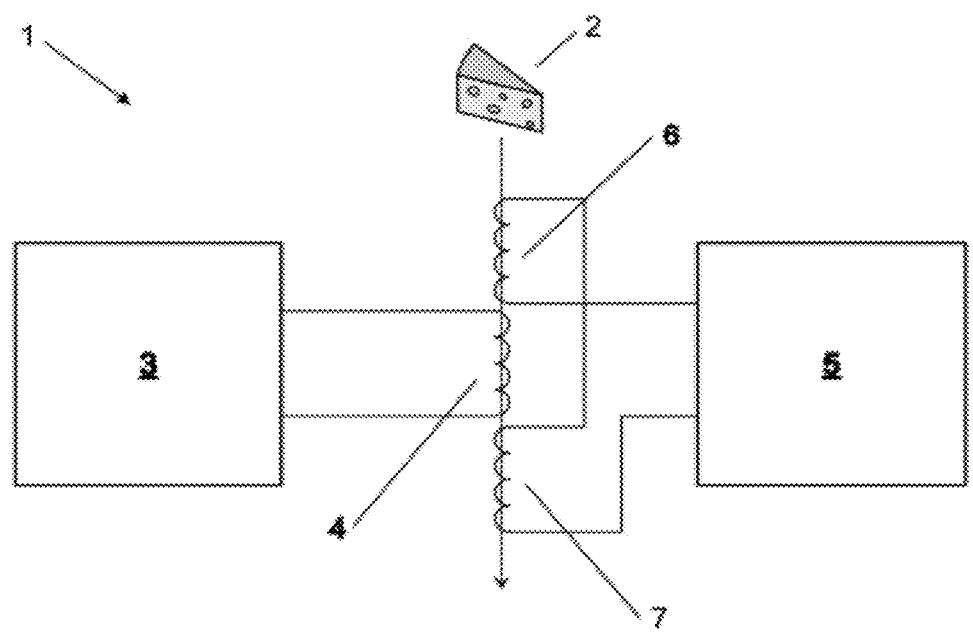
FIG. 1 shows a basic block diagram of an exemplary embodiment of a metal detection system.

FIG. 1 shows a block diagram of an embodiment of a metal detection system 1 that essentially comprises a transmitter unit 3, a balanced coil system 4, 6, 7, a receiver unit 5, and a signal processing unit.

This example of the balanced coil system comprises a transmitter coil 4 and two receiver coils 6, 7 wound on a non-metallic frame, each exactly parallel with the others. The center coil is the transmitter coil 4, which is placed exactly equidistant from the identical receiver coils 6, 7 in this embodiment. The transmitter unit 3 generates a high frequency electric current that circulates through the transmitter coil 4. The current flowing through the transmitter coil 4 generates a magnetic field, which induces identical currents in the neighboring receiver coils 6, 7. The receiver coils 6, 7 are connected in opposition, i.e., both windings are wound in inverse directions, so that the currents induced in the receiver coils 6, 7 flow in opposite directions, and thus cancel out one another when no conductive or magnetic object moves through the balanced coil system.

The products 2 to be inspected are transferred through the balanced coil system one after the other, for example on a conveyor belt. In the event that a product 2 containing a metal contaminant is moving through the balanced coil system, this metal contaminant disturbs the magnetic field first near the first receiver coil 6, and then near the second receiver coil 7, thus individually changing the signals induced in the first and in the second receiver coil 6, 7. The asymmetric changes in the signals induced in the receiver coils 6, 7 may be in the magnitude of nano-volts in an exemplary embodiment. Hence, in order to detect the metal contaminants a high sensitivity is required. In an exemplary embodiment, the receiver unit 5 is accordingly dedicated to the amplification and processing of such signals in order to detect even small sized metal contaminants of various sorts.

Figure 2:
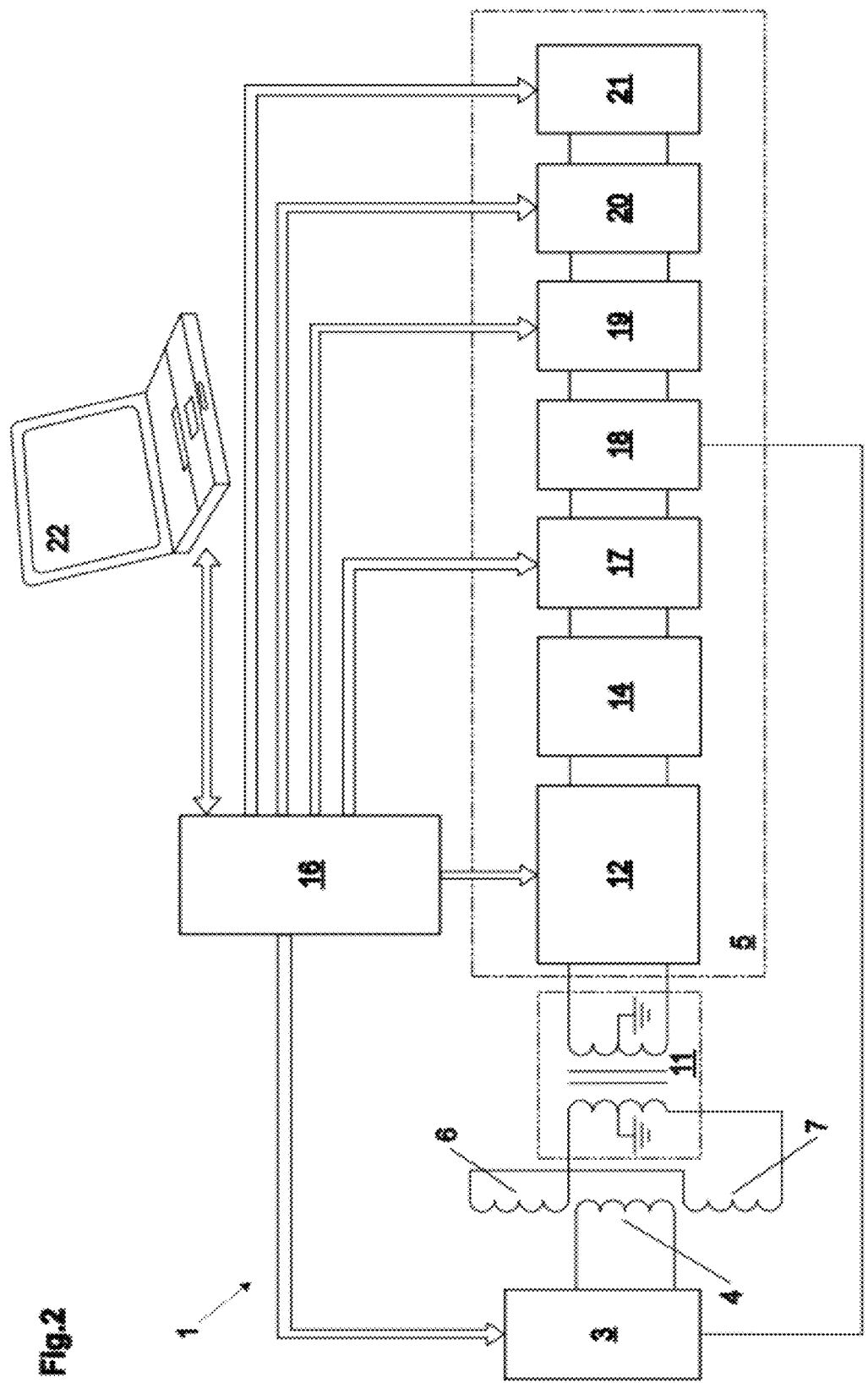
FIG. 2 shows a more detailed block diagram of an exemplary embodiment of a metal detection system and, in particular, of the receiver unit.

The metal detection system shown in FIG. 2 comprises a transmitter unit 3 that provides a transmitter signal to the transmitter coil 4 of the balanced coil system. The first and the second receiver coil 6, 7 of the balanced coil system are connected to the primary windings of a balanced input transformer 11. The secondary windings of the balanced input transformer 11 are connected via a controllable impedance unit 12 to an input of an amplifier unit 14. The output of the amplifier unit 14 is connected to a variable filter unit 17 that may be configured to the selected transmitter frequency, i.e. the modulated carrier frequency. The filtered carrier signal is forwarded to a phase sensitive detector 18 that provides the demodulated baseband signal via filter unit 19 to a gain unit 20. The resulting signal is forwarded to an analog to digital converter 21 that provides a digitized signal to a signal processor. In order to control the described processes and to operate the system, the metal detection system further comprises a control unit 16, which is connected to a computer terminal 22.

In an exemplary embodiment, the transmitter unit 3 may provide a transmitter signal with a selectable transmitter frequency, preferably in the range of a few kHz to 1 MHz, to the transmitter coil 4 of the balanced coil system. Further, the transmitter unit 3 may provide a reference signal with the transmitter frequency to the receiver unit 18 for demodulation purposes.

The receiver coils 6, 7 are connected to the center-tapped primary windings of the balanced input transformer 11 that mirror the receiver coils 6, 7. Further, the balanced input transformer 11 comprises two identical center-tapped secondary windings that are connected to a controllable impedance unit 12.

The controllable impedance unit 12 applies a variable impedance value to the input of the amplifier unit 14. The impedance value of the controllable impedance unit 12 represents the input resistance of the amplifier unit 14 and defines in that way the gain of the amplifier unit 14. The receiver signal amplified by the amplifier unit 14 in accordance with the setting of the controllable impedance unit is provided to a variable filter unit 17 that removes the harmonic content of the amplified receiver signal.

In this example, the control unit 16 provides a first control signal to the transmitter unit 3 for selecting the transmitter frequency, a second control signal to the controllable impedance unit 12 for selecting the impedance value according to the selected transmitter frequency, and a third control signal to the filter unit 17 for selecting the filter characteristics according to the selected transmitter frequency or a carrier frequency.

Hence, depending on the selected transmitter frequency, a suitable impedance value for the controllable impedance unit 12 is selected. The variable filter unit 17 may be designed in various ways. Preferably, the variable filter unit 17 in an exemplary embodiment comprises a number of filter entities that are dedicated to the number of selectable transmitter frequencies (see, e.g., FIG. 6). The filter units are preferably designed as band-pass filters or low-pass filters that allow the carrier signal to pass through to the next module of the signal processing chain. Hence, the filter entity of the variable filter unit 17 may be selected to correspond to the transmitter frequency with the control signal received from the control unit 16.

In FIG. 2, the output signal of the variable filter unit 17 is provided to a phase sensitive detector 18 that demodulates the transmitter signal and the amplified and filtered receiver signal. At its outputs, it provides the in-phase and the quadrature components of the demodulated receiver signal, relative to the demodulated transmitter operating signal.

The output signals of the phase sensitive detector 18 are forwarded to a further filter unit 19 that allows the desired signals to pass through a gain unit 20 that allows setting the amplitudes of the processed signals to a desired value. Subsequently, the filtered and calibrated signals are converted by an analog to digital converter 21 from analog to digital form. The output signals of the analog to digital converter 21 are forwarded to a signal processor that may be located in the control unit 16. The signal processor is programmed in such a way that the received signals are processed, analyzed, and evaluated in order to suppress unwanted signals and to detect signals originating from metal contaminants. The resulting data are then forwarded from the signal processor and the control unit 16 to a computer terminal 22 attached thereto.

Figure 3:
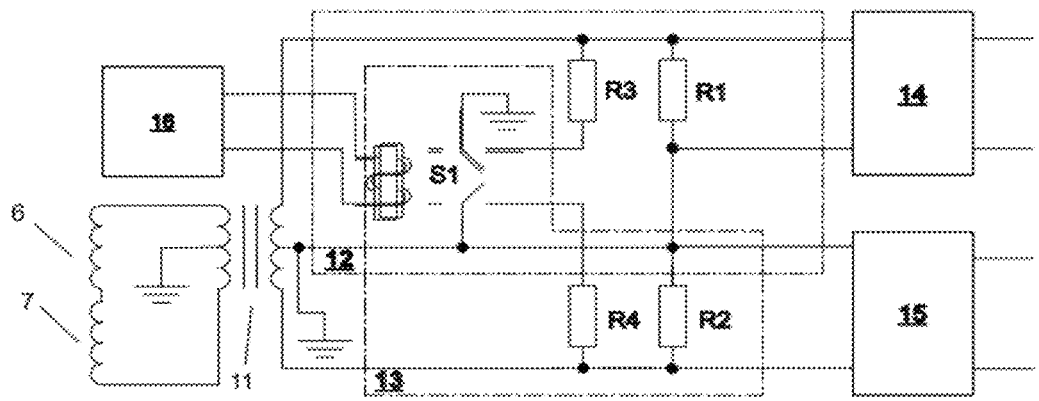
FIG. 3 shows a schematic diagram of an exemplary embodiment of a controllable impedance unit.

FIG. 3 shows a schematic diagram of an exemplary embodiment of the input stage of the receiver unit that comprises two controllable impedance units 12, 13 that are each connected on the input side to a terminal of the center tapped secondary winding of the balanced input transformer 11, and on the output side to the related input amplifier 14, 15. The center tap of the secondary winding is connected to ground.

In this example, each of the controllable impedance units 12, 13 comprises a fixed first resistor R1, R2 that is connected, with one end to the related terminal of the secondary winding and to the input of the related amplifier 14, 15, and with the other end to ground. Each of the controllable impedance units 12, 13 further comprises a second resistor R3, R4 that is connected on one side to the related terminal of the secondary winding and on the other side to a switch S1, preferably a relay or a transistor, that, if actuated, connects the second resistor R3, R4 to ground.

The relay S1 is controlled by the second control signal that is generated by the control unit 16 in accordance with the selected transmitter frequency. By switching the relay S1, the first and second resistor R1, R2, R3, R4 can be connected in parallel or can be disconnected so that the impedance value of the controllable impedance units 12, 13 varies accordingly. Consequently, the input impedance and the gain of the related amplifier unit 14, 15 vary as well. For a more accurate setting, the controllable impedance units 12, 13 may comprise more than two selectable impedance values. Each impedance unit 12, 13 may comprise resistor banks, with an appropriate number of resistors that may be selected individually or in combination in order to accurately adjust the impedance values of the controllable impedance units 12, 13.

Figure 4:
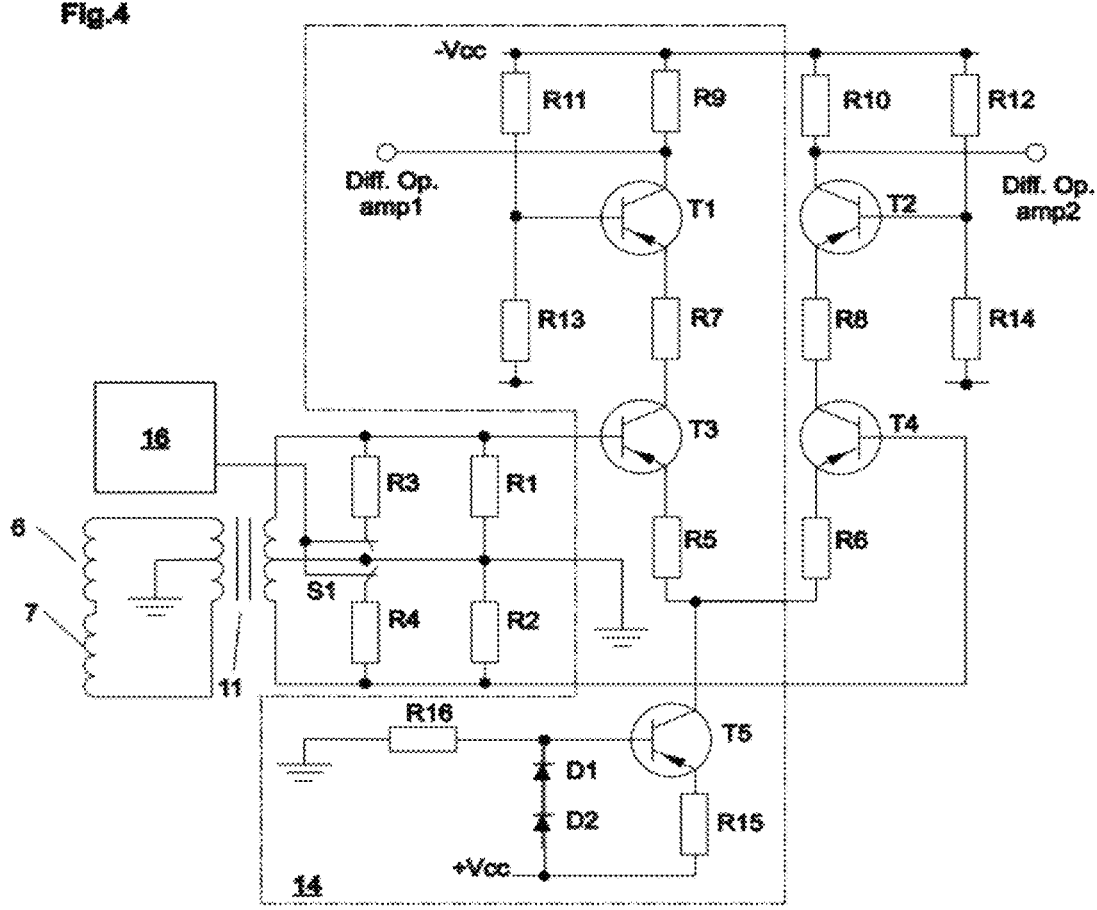
FIG. 4 shows a schematic diagram of an exemplary embodiment of a bipolar cascode amplifier.

FIG. 4 shows the receiver unit of FIG. 3 with an exemplary embodiment of the amplifier unit 14, 15, without the operational amplifiers provided in a second stage.

The differential input cascode bipolar amplifier shown in this exemplary embodiment is the first stage of the amplifier units 14, 15. All the transistors of this example are pnp-transistors. The output of each controllable impedance unit 12 described in FIG. 3 is connected to the base of a respective transistor T3, T4, that is connected with the emitter via a respective resistor R5, R6 to a constant current source.

The constant current source comprises a transistor T5 with a resistor R15 between a power supply voltage +Vcc and its emitter and two diodes D1 and D2 between the power supply voltage +Vcc and its base, and a resistor R16 connected between the base and ground, and with its collector connected via the respective resistors R5, R6 to the respective transistors T3, T4.

Each transistor T3, T4 with the respective resistor R5, R6 at its emitter is configured as a common emitter follower. The collector of each transistor T3, T4 is connected via a respective resistor R7, R8 to the emitter of a respective transistor T1, T2 that is configured like a common base amplifier. Each of the resistors R11, R12, R13, R14 is respectively connected with one end to the base of a respective transistor T1, T2 and with the other end to the negative power supply voltage −Vcc respectively to ground. The collector of each transistor T1, T2 is respectively connected on the one hand via a respective resistor R9, R10 to the negative power supply voltage −Vcc and on the other hand to the second stage of a respective amplifier 14, 15, i.e., to the input of the related operational amplifier Diff. Op amp1, Diff. Op amp2 of amplifiers 14, 15.

In this embodiment, each cascode amplifier forms a differential amplifier. A differential amplifier is a symmetrical amplifier with two inputs and two outputs that amplifies the potential difference of the outputs of the controllable impedance units. In this example, both cascode amplifiers are connected to a common current source formed by transistor T5 and diodes D1 and D2 so that the sum of their currents remains constant. The differential amplifier has the capability of amplifying the differential potential between the two inputs independently of the voltage available at the connection with the current source formed by transistor T5. In this example, due to its output being electrically and physically separated from its input, the output of the cascode amplifier is stable, has no effect limiting the bandwidth, and furthermore has a high gain.

Figure 5:
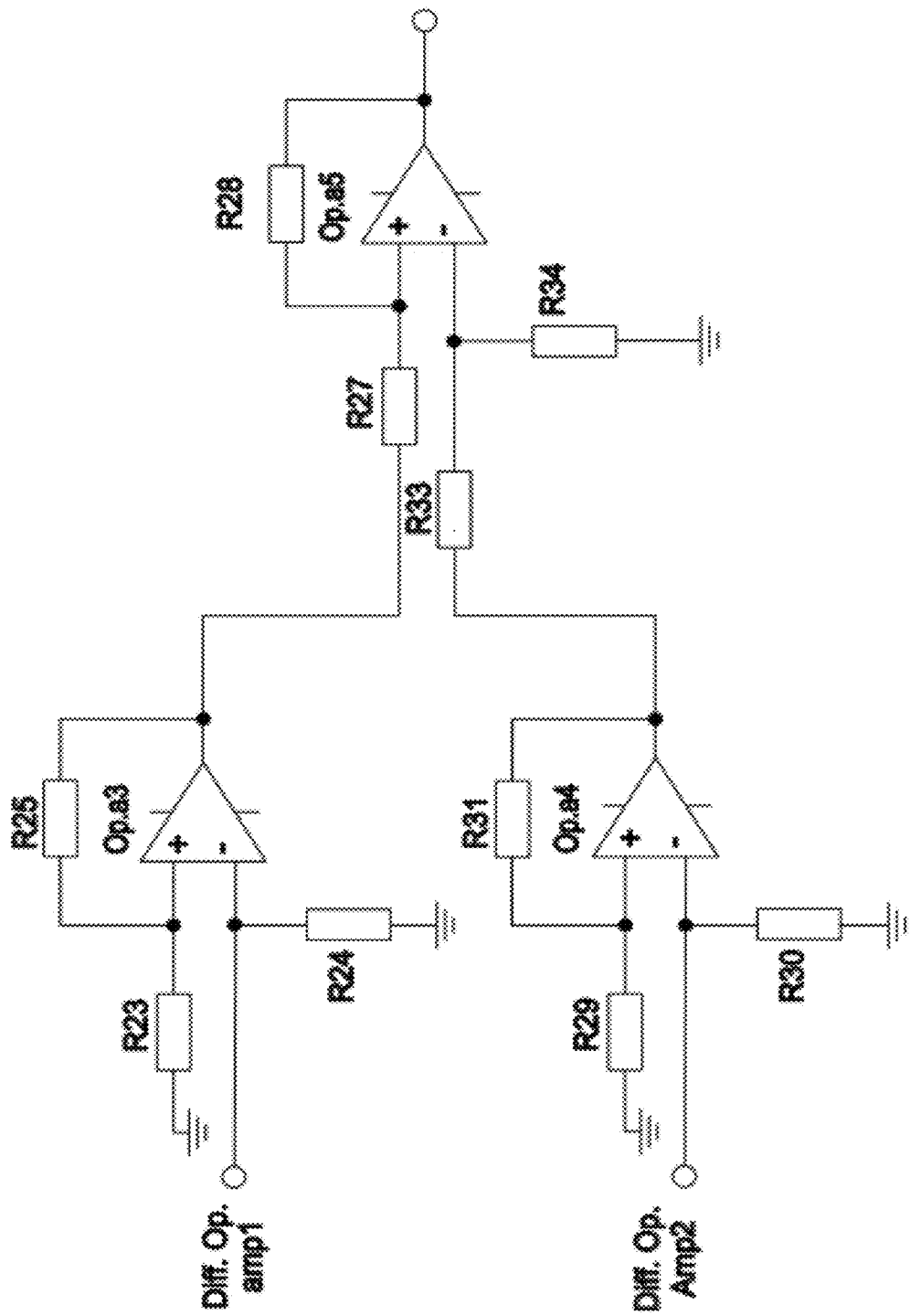
FIG. 5 shows a schematic diagram of an exemplary embodiment of a differential amplifier.

FIG. 5 shows the receiver unit of FIG. 3 with an exemplary embodiment of the second stage of the amplifier units 14, 15 that are connected to the outputs of the first stage showed on FIG. 4.

The first input of the second stage is connected to the non-inverting input of an operational amplifier Op.a3 and via a resistor R24 to ground. The inverting input of the operational amplifier is connected to its output via a resistor R25, and to ground via the resistor R23.

The second input of the second stage is connected to the non-inverting input of an operational amplifier Op.a4 and via a resistor R30 to ground. The inverting input of the operational amplifier is connected to its output via a resistor R31, and to ground via the resistor R29.

The non-inverting input of Op.a5 is connected to ground via resistor R34 and the inverting input is connected to the output of the operational amplifier Op.a5 via the resistor R28.

In this example, the operational amplifiers Op.a3 and Op.a4 are configured as non-inverting amplifiers. Their outputs are respectively connected to the non-inverting input of the operational amplifier Op.a5 via resistor R33 and to the inverting input of the operational amplifier Op.a5 via resistor R27. They provide to the operational amplifier Op.a5 their input signals amplified by a constant factor respectively determined by R23, R24, and R25, and R29, R30, and R31.

The operational amplifier Op.a5 is configured as a differential amplifier. Its output provides the difference between the voltages of the inputs Diff. Op amp1 and Diff. Op amp2, multiplied by a constant factor determined by the values of the resistors R27, R28, R33, and R34.

Figure 6:
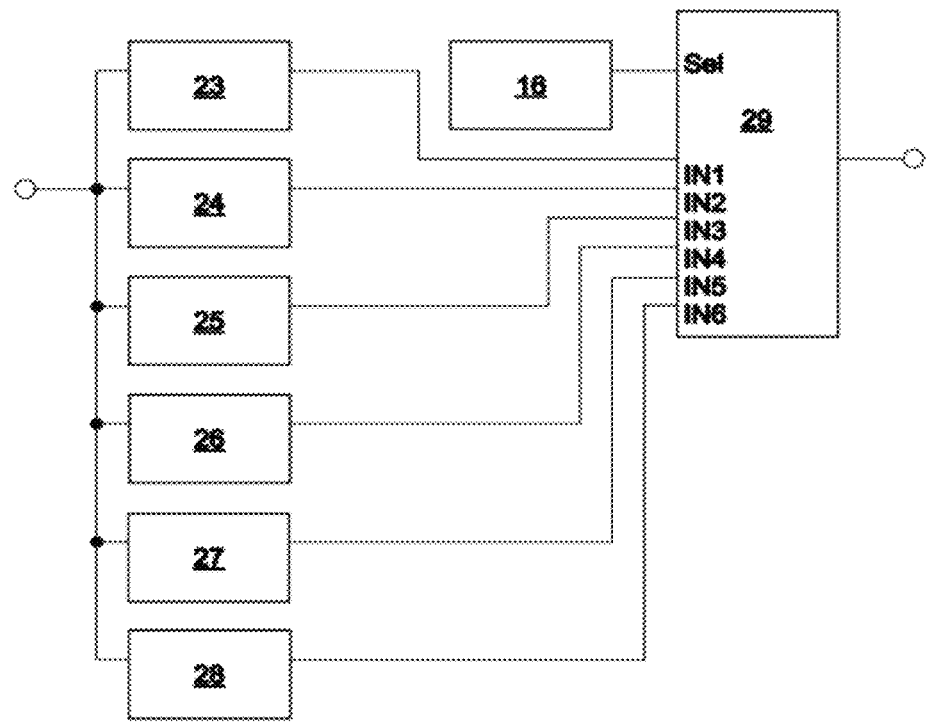
FIG. 6 shows a block diagram of an exemplary embodiment of a variable filter unit.

FIG. 6 shows the block diagram of an example of a variable filter unit 16. It contains six low-pass filters 23-28. Each of them has a different cut-off frequency. The amplified receiver signal is forwarded to the inputs of all six low-pass filters 23-28 that provide their output signals to a multiplexer 29. The multiplexer is controlled by the third control signal that is generated by the control unit 16 in accordance with the selected transmitter frequency. One of the low pass filters 23-28, that has an appropriate cut-off frequency, is selected by the control unit 16 according to the applied transmitter frequency. The filtered signal is then forwarded from the output of the multiplexer 29 to the input of the phase sensitive detector 18.

Figure 7:
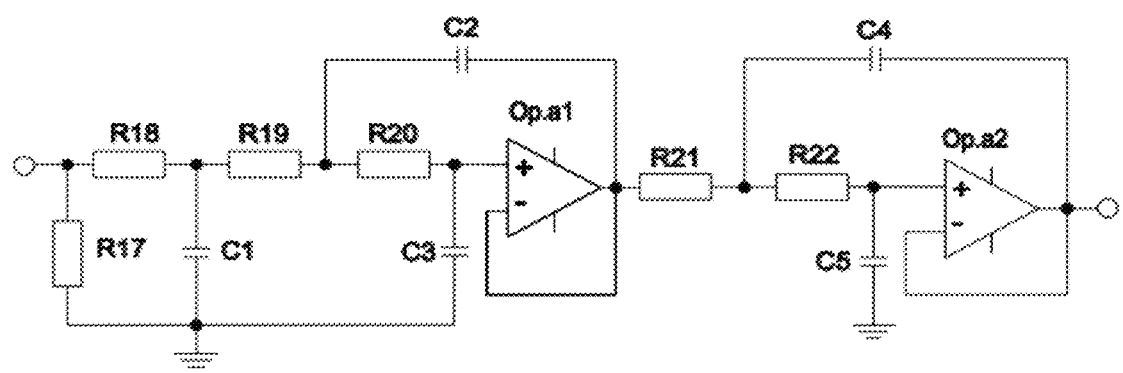
FIG. 7 shows a schematic diagram of an exemplary embodiment of a filter unit.

FIG. 7 illustrates a schematic diagram of a filter unit 23-28, which preferably is designed as voltage-controlled voltage source (VCVS) filter or variations thereof, such as Sallen-Key filters. Sallen-Key topologies are used to implement second-order active filters. Implementations of Sallen-Key filters often use an operational amplifier configured as a voltage follower; however, emitter or source followers are other common choices for the buffer amplifier. A Sallen-Key filter is a variation of a VCVS filter that uses a unity-gain amplifier (i.e., a pure buffer amplifier with 0 dB gain).

The filter unit shown in FIG. 7 comprises a fifth order Butterworth low-pass filter made up of one RC-cell formed by resistors R17, R18 and capacitor C1, followed by two second order Sallen-Key circuits.

The first Sallen-Key circuit comprises a first resistor R19, which is connected to the output of an operational amplifier Op.a1 via a first capacitor C2 and via a second resistor R20 to the non-inverting input of operational amplifier Op.a1 that is connected to ground via a second capacitor C3. The output of the operational amplifier Op.a1 is further connected to the inverting input of the operational amplifier Op.a1.

The second Sallen-Key circuit comprises a first resistor R21, which is connected to the output of an operational amplifier Op.a2 via a first capacitor C4 and via a second resistor R22 to the non-inverting input of operational amplifier Op.a2 that is connected to ground via a second capacitor C5. The output of the operational amplifier Op.a2 is further connected to the inverting input of the operational amplifier Op.a2.

The first order filter, namely the RC-cell R17, R18, C1, and the two second order Sallen-Key-Filters provide in combination the exemplary fifth order filter.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A method for operating a metal detection system comprising a balanced coil system with a transmitter coil that is connected to a transmitter unit, which is adapted to generate transmitter signals having a transmitter frequency that is selected from a group of at least two transmitter frequencies, and with a first and a second receiver coil that are adapted to provide output signals to a signal input of at least one amplifier unit included in a receiver unit, wherein the output signals are adapted to compensate each other so that the system is in balance, said method comprising:

providing a control unit that generates a control signal according to the transmitter frequency of the transmitter unit;

providing the control signal to a control input of at least one controllable impedance unit, which is coupled to the signal input of the at least one amplifier unit; and controlling an impedance value of the at least one controllable impedance unit with the control signal in such a way that the impedance value is increased or lowered when the transmitter frequency is increased or lowered.

2. The method of claim 1 wherein the receiver coils are respectively connected with one tail to each other and with another tail to respective tails of two identical center-tapped primary windings of a balanced transformer having two identical center-tapped secondary windings whose tails are connected via the at least one controllable impedance unit to the at least one amplifier unit.

3. The method of claim 1 wherein the at least one controllable impedance unit comprises at least one variable resistor that is controlled by the control signal.

4. The method of claim 1 wherein the at least one controllable impedance unit comprises at least one switching unit that is controlled by the control signal and that connects at least one resistor of a group of at least two resistors or a combination thereof to output terminals of the at least one controllable impedance unit.

5. The method of claim 1 wherein the impedance value of the controllable impedance unit is selected between 20 ohm and 100 ohm for transmitter frequencies between 1 kHz and 300 kHz.

6. The method of claim 1 wherein the impedance value of the controllable impedance unit is selected between 200 ohm and 400 ohm for transmitter frequencies between 300 kHz and 1 MHz.

7. The method of claim 1 wherein:
an output signal of the at least one amplifier unit is filtered by a variable filter unit having a selectable bandwidth, such that at least one filter device is adapted to be coupled to a signal path by means of a second switching unit;
wherein said bandwidth is selected in accordance with the selected transmitter frequency.

8. The method of claim 1 wherein the at least one amplifier unit comprises a bipolar transistor cascode amplifier such that an output thereof is coupled to a differential amplifier.

9. The method of claim 1 wherein settings for the at least one controllable impedance unit and/or corresponding settings for the variable filter unit of claim 7 are selected from a table provided in the control unit, such that the table contains at least a set of transmitter frequencies and corresponding settings for the at least one controllable impedance unit and/or corresponding settings for the variable filter unit.

10. A metal detection system comprising:
a balanced coil system with a transmitter coil coupled to a transmitter unit, which is adapted to generate transmitter signals having a transmitter frequency that is selected from a group of at least two transmitter frequencies, and with a first and a second receiver coil that are adapted to provide output signals to a signal input of at least one amplifier unit contained in a receiver unit, wherein the output signals are adapted to compensate each other so that the system is in balance; and
at least one controllable impedance unit connected with the signal input of the at least one amplifier unit and adapted to be controlled by a control unit configured to provide a control signal to a control input of the at least one controllable impedance unit, which is selectable according to the transmitter frequency of the transmitter unit, such that an impedance value of the at least one controllable impedance unit is adapted to be increased or lowered when the transmitter frequency is increased or lowered.

11. The metal detection system of claim 10 wherein the receiver coils are connected with one tail to each other and with another tail to respective tails of two identical center-tapped primary windings of a balanced transformer having two identical center-tapped secondary windings whose tails are connected via the at least one controllable impedance unit to the at least one amplifier unit.

12. The metal detection system of claim 10 wherein the at least one controllable impedance unit comprises at least one variable resistor that is adapted to be controlled by the control signal.

13. The metal detection system of claim 10 wherein the at least one controllable impedance unit comprises a group of at least two resistors and at least one switching unit that is configured to be controlled by the control signal so that at least one resistor of the group of at least two resistors or a combination thereof is adapted to be connected to output terminals of the at least one controllable impedance unit.

14. The metal detection system of claim 10 wherein the impedance value of the controllable impedance unit is adapted to be selected in a range between 20 ohm and 100 ohm for transmitter frequencies between 1 kHz and 300 kHz.

15. The metal detection system of claim 10 wherein the impedance value of the controllable impedance unit is adapted to be selected in a range between 200 ohm and 400 ohm for transmitter frequencies between 300 kHz and 1 MHz.

16. The metal detection system of claim 10 wherein:
a signal output of the at least one amplifier unit is coupled to a signal input of a variable filter unit that has a selectable bandwidth and comprises at least one filter device that is adapted to be coupled to a signal path by means of a second switching unit; and
the control unit is adapted to provide a control signal to a control input of the variable filter unit and the bandwidth is adapted to be selected in accordance with the selected transmitter frequency.

17. The metal detection system of claim 10 wherein the at least one amplifier unit comprises a bipolar transistor cascode amplifier having an output coupled to a differential amplifier.

18. The metal detection system of claim 10 wherein the control unit has a table of transmitter frequencies and corresponding settings for the at least one controllable impedance unit and/or corresponding settings for the variable filter unit of claim 16.

19. A metal detection system comprising:
a balanced coil system with a transmitter coil coupled to a transmitter unit, which is adapted to generate transmitter signals having a transmitter frequency that is selected from a group of at least two transmitter frequencies, and with a first and a second receiver coil that are adapted to provide output signals to a signal input of at least one amplifier unit contained in a receiver unit, wherein the output signals are adapted to compensate each other such that the system is in balance, the receiver coils connected with one tail to each other and with another tail to respective tails of two identical center-tapped primary windings of a balanced transformer having two identical center-tapped secondary windings; and
at least one controllable impedance unit connected to tails of the secondary windings of the balanced transformer, the at least one controllable impedance unit further connected with the signal input of the at least one amplifier unit and adapted to be controlled by a control unit configured to provide a control signal to a control input of the at least one controllable impedance unit, which is selectable according to the transmitter frequency of the transmitter unit, such that an impedance value of the at least one controllable impedance unit is adapted to be increased or lowered when the transmitter frequency is increased or lowered;

wherein the at least one controllable impedance unit comprises a group of at least two resistors and at least one switching unit that is configured to be controlled by the control signal such that at least one resistor of the group of at least two resistors or a combination thereof is adapted to be connected to output terminals of the at least one controllable impedance unit.

20. The metal detection system of claim 19 wherein:
a signal output of the at least one amplifier unit is coupled to a signal input of a variable filter unit that has a selectable bandwidth and comprises at least one filter device that is adapted to be coupled to a signal path by means of a second switching unit; and the control unit is adapted to provide a control signal to a control input of the variable filter unit and the bandwidth is adapted to be selected in accordance with the selected transmitter frequency.

* * * * *